United States Patent
Vasseur et al.

(10) Patent No.: US 8,559,442 B2
(45) Date of Patent: Oct. 15, 2013

(54) DIVERSE PATH FORWARDING THROUGH TRIAL AND ERROR

(75) Inventors: Jean-Philippe Vasseur, Saint Martin d'Uriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 13/188,609

(22) Filed: Jul. 22, 2011

(65) Prior Publication Data

US 2013/0022046 A1    Jan. 24, 2013

(51) Int. Cl.
  *H04L 12/28* (2006.01)
  *G06F 15/173* (2006.01)
  *G06F 11/00* (2006.01)

(52) U.S. Cl.
  USPC ............... 370/395.32; 709/238; 714/6

(58) Field of Classification Search
  USPC ............ 370/395.2–395.32; 709/230–244; 714/5–8
  See application file for complete search history.

(56) References Cited

U.S. PATENT DOCUMENTS

| | | | | |
|---|---|---|---|---|
| 6,041,358 A | * | 3/2000 | Huang et al. ................ | 709/238 |
| 6,421,731 B1 | * | 7/2002 | Ciotti et al. ................ | 709/238 |
| 7,490,165 B1 | | 2/2009 | Katukam et al. | |
| 7,710,902 B2 | | 5/2010 | Vasseur et al. | |
| 7,835,267 B2 | | 11/2010 | Zamfir et al. | |
| 7,853,715 B1 | | 12/2010 | Katukam et al. | |
| 7,903,584 B2 | | 3/2011 | Vasseur et al. | |
| 7,983,270 B2 | * | 7/2011 | Wong ................ | 370/395.31 |
| 8,452,888 B2 | * | 5/2013 | Chan et al. ................ | 709/232 |
| 2002/0133622 A1 | * | 9/2002 | Pinto ................ | 709/242 |
| 2005/0080920 A1 | * | 4/2005 | Bender et al. ................ | 709/236 |
| 2005/0080933 A1 | * | 4/2005 | Herring ................ | 709/249 |
| 2006/0050641 A1 | * | 3/2006 | Brown et al. ................ | 370/236 |
| 2008/0013542 A1 | * | 1/2008 | Youm et al. ................ | 370/395.3 |
| 2010/0125674 A1 | | 5/2010 | Vasseur et al. | |

OTHER PUBLICATIONS

Tsiftes et al, "Poster Abstract: Low-Power Wireless IPv6 Routing with ContikiRPL", IPSN'10, Apr. 12-16, 2010, Stockholm, Sweden. ACM 978-60558-988-Jun. 10, 2004.*
Ayadi et al, "TCP over Low-Power and Lossy Networks: Tuning the Segment Size to Minimize Energy Consumption", IEEE New Technologies, Mobility and Security (NTMS), 2011 4th IFIP International Conference, Publication Year: 2011, pp. 1-5.*
"RPL: IPv6 Routing Protocol for Low Power and Lossy Networks" <draft-ietf-roll-rpl-19> by Winter, at al. (Mar. 13, 2011 version).

* cited by examiner

*Primary Examiner* — Thai Hoang
(74) *Attorney, Agent, or Firm* — Edwards Wildman Palmer LLP; James M. Behmke; Stephen D. LeBarron

(57) ABSTRACT

In one embodiment, a node determines an intention to transmit a diversely forwarded packet through a computer network, and as such, transmits a first version of the packet having a packet identifier (ID) and a first distinguisher value to a first next-hop node, and transmits a second version of the packet having the same packet ID and a second distinguisher value different from the first distinguisher value to a second next-hop node different from the first next-hop node. In another embodiment, a next-hop node that receives the packet determines whether any previously received packet at the next-hop node had a same packet ID and a different distinguisher value. In response to determining that no previously received packet has the same packet ID and different distinguisher value, the next-hop node stores the packet ID and the distinguisher value, and forwards the packet to a selected next-hop node.

16 Claims, 13 Drawing Sheets

| PACKET ID 410 | DISTINGUISHER VALUE 420 |
|---|---|
| "A" | "1" |
| "B" | "1" |
| "C" | "2" |
| ... | ... |

TABLE/CACHE 400

FIG. 4

DIVERSE PATH FORWARDING THROUGH TRIAL AND ERROR

TECHNICAL FIELD

The present disclosure relates generally to computer networks, and, more particularly, to diverse paths through computer networks, e.g., low power and lossy networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

There are many circumstances where it is desired to make use of what is referred to as "1+1" protection, where packets are duplicated and sent along diverse paths. The issue of computing diverse paths in a network greatly varies in complexity with the routing environment. For instance, in networks using a Link State routing protocol in a "flat" (non multi-area/level environment), known techniques such as the "Bhandari" algorithms can be used to simultaneously compute diverse paths. In such networks where the path spans multiple routing areas/level or AS, computing diverse paths becomes much more challenging, e.g., first computing one path, and then computing another path that is diverse from the first. Though useful in these environments, note that this two-step approach cannot guarantee finding diverse paths, and it is quite difficult to optimize, e.g., the sum of costs between the two paths, etc.

The issue then becomes even more difficult in networks using a distance vector routing protocol, such as RPL. For instance, each RPL instance is represented as a DODAG anchored at a root node, called an LBR (LLN Border Router). In a RPL "non-storing" mode, where packets may be source routed, it is possible to compute diverse paths from the DAG root after collecting the topology database, e.g., computing diverse paths in a manner similar to computing diverse paths in link-state routing environments understood in the art. However, computing diverse paths is much more difficult in the reverse direction, i.e., computing diverse paths from each node to the root, which is particularly exacerbated in constrained networks, e.g., LLNs.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example table/cache.

DESCRIPTION OF EXAMPLE EMBODIMENTS

Overview

Figure 1:
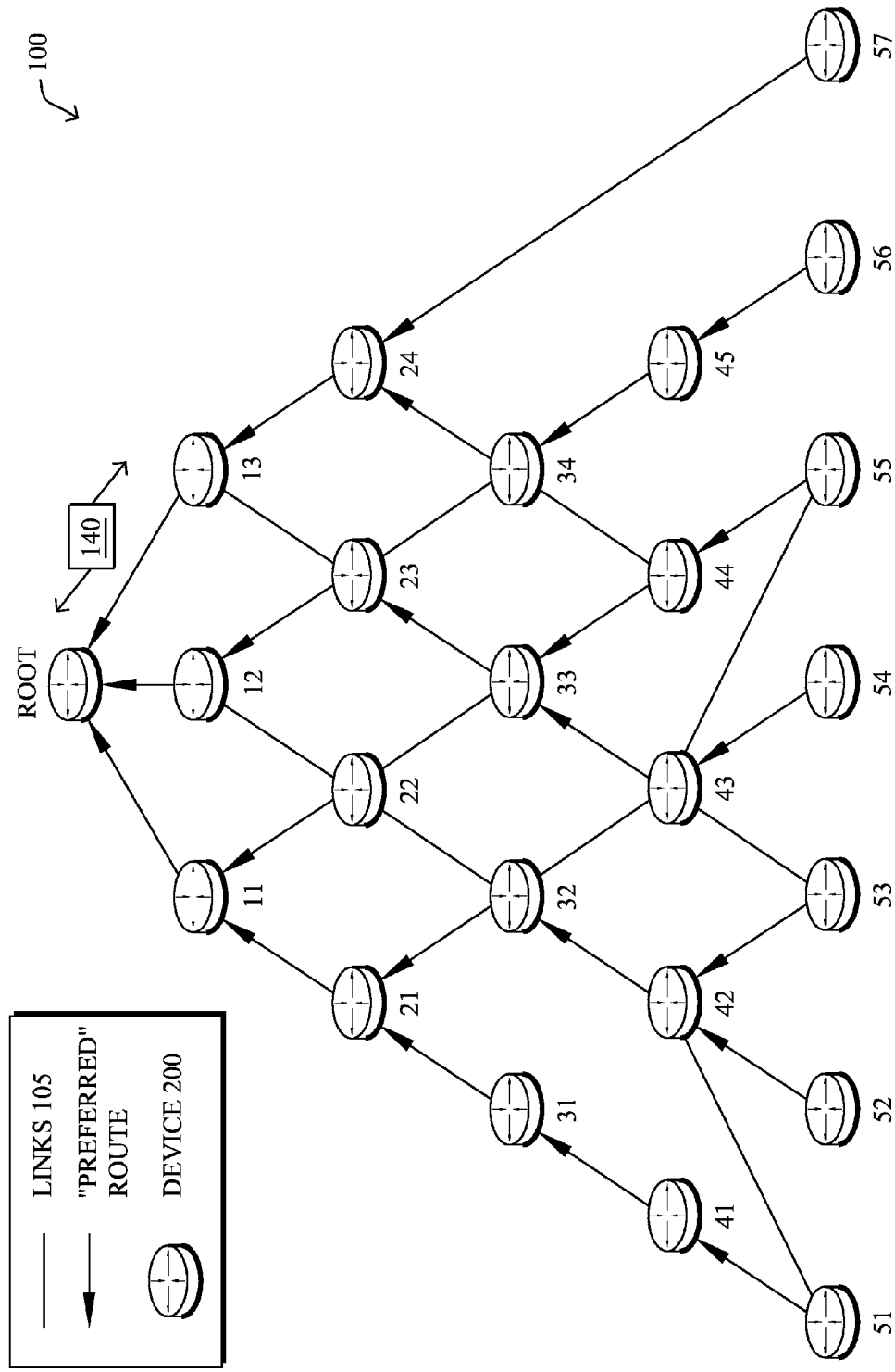
FIG. 1 illustrates an example computer network.

According to one or more embodiments of the disclosure, a node determines an intention to transmit a diversely forwarded packet through a computer network, and as such, transmits a first version of the packet having a packet identifier (ID) and a first distinguisher value to a first next-hop node, and transmits a second version of the packet having the same packet ID and a second distinguisher value different from the first distinguisher value to a second next-hop node different from the first next-hop node. Additionally, according to one or more embodiments of the disclosure, a next-hop node that receives the packet having a packet ID and a particular distinguisher value determines whether any previously received packet at the next-hop node had a same packet ID and a different distinguisher value. In response to determining that no previously received packet has the same packet ID and different distinguisher value, the next-hop node stores the packet ID and the distinguisher value, and forwards the packet to a selected next-hop node. In one embodiment, if a previously received packet did have the same packet ID and different distinguisher value, then the packet would not be forwarded, and a transmitting node from which the packet was received would try to send the packet to a different next-hop node, accordingly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc.

Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," ... "57", and described in FIG. 2 below) interconnected by various methods of communication. For instance, the links 105 may be wired links and/or shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, and/or other shared-media protocols where appropriate. In this context, a protocol consists of a set of rules defining how the nodes interact with each other.

Figure 2:
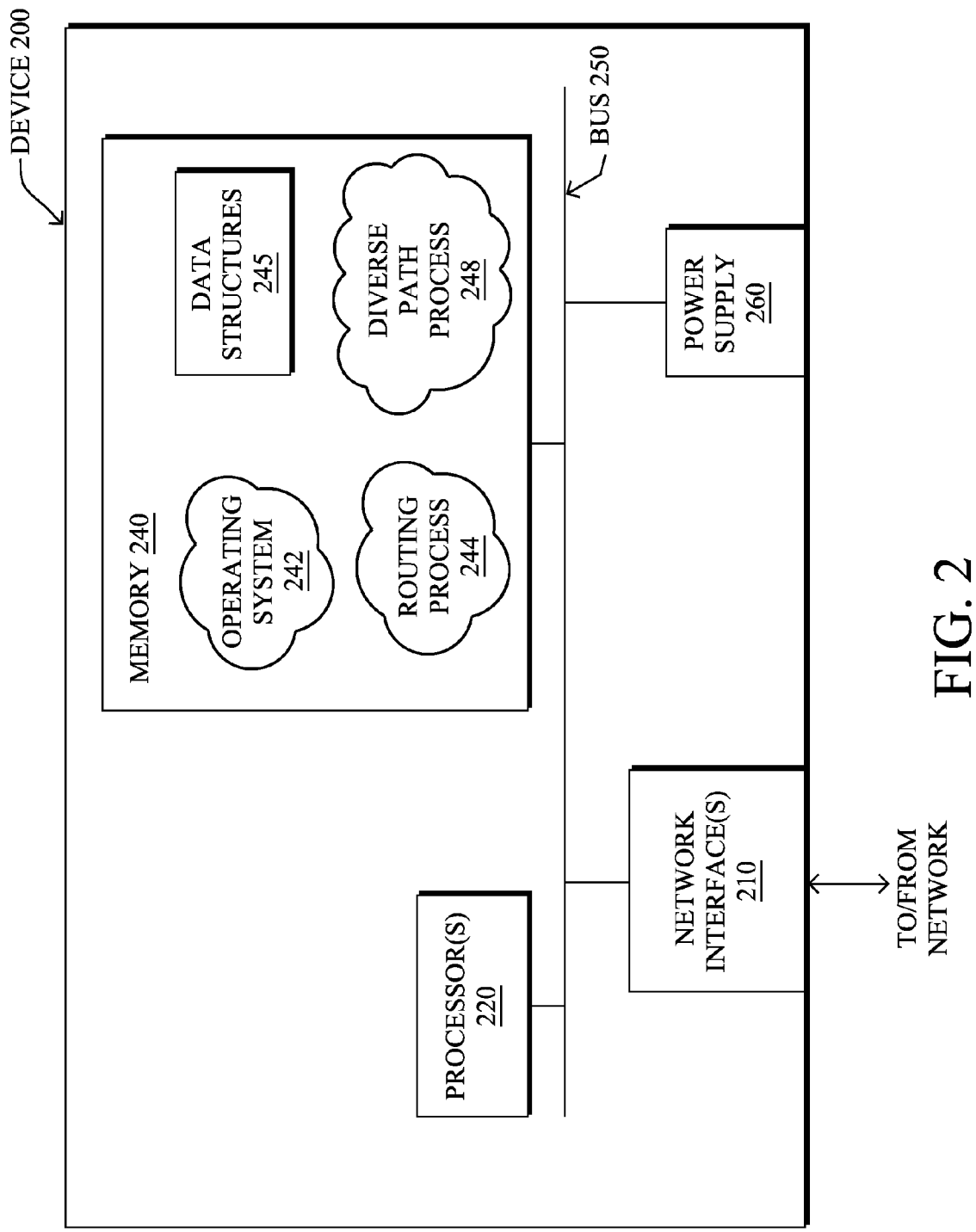
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative "diverse path" process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietfroll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

As an example, the network 100 depicted in FIG. 1 shows an LLN where paths have been computed using a routing protocol, where the arrows show preferred path. Note that while the arrows could be considered a DAG, no assumption is made herein on the nature of the underlying routing protocol.

As noted above, there are many circumstances where it is desired to make use of what is referred to as "1+1" protection, where packets are duplicated and sent along diverse paths. The issue of computing diverse paths in a network greatly varies in complexity with the routing environment. For instance, in networks using a Link State routing protocol in a "flat" (non multi-area/level environment), known techniques such as the "Bhandari" algorithms can be used to simultaneously compute diverse paths. In such networks where the path spans multiple routing areas/level or AS, computing diverse paths becomes much more challenging, e.g., first computing one path, and then computing another path that is diverse from the first. Though useful in these environments, note that this two-step approach cannot guarantee finding diverse paths, and it is quite difficult to optimize, e.g., the sum of costs between the two paths, etc.

The issue then becomes even more difficult in networks using a distance vector routing protocol, such as RPL. For instance, as noted, each RPL instance is represented as a DODAG anchored at a root node, called an LBR (LLN Border Router). In a RPL "non-storing" mode, where packets may be source routed, it is possible to compute diverse paths from the DAG root after collecting the topology database, e.g., computing diverse paths in a manner similar to computing diverse paths in link-state routing environments understood in the art.

However, computing diverse paths is much more difficult in the reverse direction, i.e., computing diverse paths from each node to the root, which is particularly exacerbated in constrained networks, e.g., LLNs.

Trial and Error Path Diversity

In contrast with conventional approaches, the techniques herein do not rely on routing topology knowledge to compute diverse paths, but makes use of a data-driven technique to send packets (e.g., critical packets) along diverse paths. In general, the core of this approach consists of sending a first copy of a packet along a preferred path, and the first copy (or hash) is temporarily stored on visited nodes. Using the stored packet/hash, it may be determined whether a packet sent along a second path is sharing common network resources with the first. That is, if a different copy of the same packet is received by a node, a signal may be illustratively sent back to the sender, such that the sender redirects the different copy of the packet to an alternate next-hop, thus following a trial and error based diverse path.

Specifically, according to one or more embodiments of the disclosure as described in detail below, a node determines an intention to transmit a diversely forwarded packet through a computer network, and as such, transmits a first version of the packet having a packet identifier (ID) and a first distinguisher value to a first next-hop node, and transmits a second version of the packet having the same packet ID and a second distinguisher value different from the first distinguisher value to a second next-hop node different from the first next-hop node. Additionally, according to one or more embodiments of the disclosure, a next-hop node that receives the packet having a packet ID and a particular distinguisher value determines whether any previously received packet at the next-hop node had a same packet ID and a different distinguisher value. In response to determining that no previously received packet has the same packet ID and different distinguisher value, the next-hop node stores the packet ID and the distinguisher value, and forwards the packet to a selected next-hop node. In one embodiment, if a previously received packet did have the same packet ID and different distinguisher value, then the packet would not be forwarded, and a transmitting node from which the packet was received would try to send the packet to a different next-hop node, accordingly.

Illustratively, the techniques described herein may be performed by hardware, software, and/or firmware, such as in accordance with the "diverse path" process 248, which may contain computer executable instructions executed by the processor 220 to perform functions relating to the novel techniques described herein, e.g., in conjunction with routing process 244. For example, the techniques herein may be treated as extensions to conventional protocols, such as the RPL protocol or various communication protocols operating specifically on a network interface 210 (e.g., MAC-layer and/or link-layer operation), and as such, may be processed by similar components understood in the art that execute those protocols, accordingly.

Figure 3:
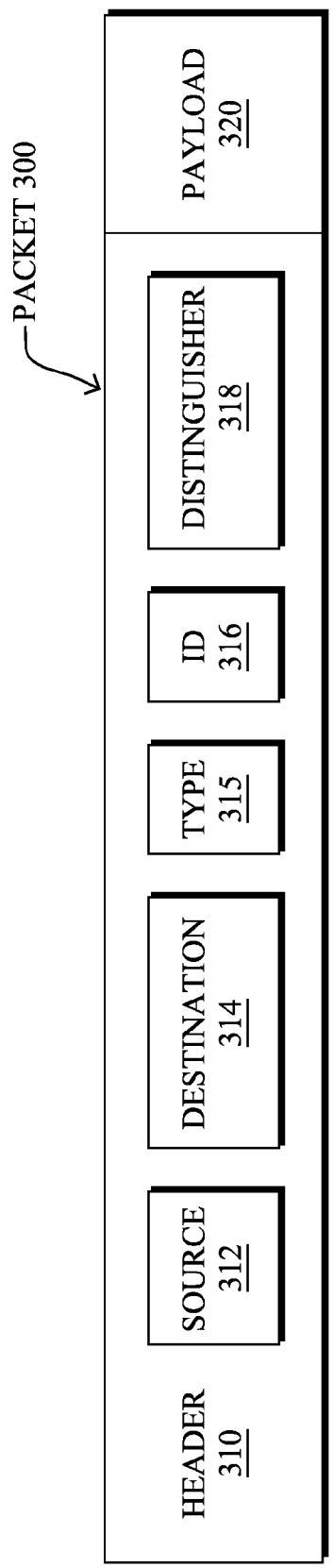
FIG. 3 illustrates an example packet.

Operationally, an originating node (source), such as node 51 in FIG. 1, first determines an intention to transmit a diversely forwarded packet through a computer network 100. The source then generates the first version/copy of the data packet. FIG. 3 illustrates an example simplified packet 300 (e.g., 140) that may be used in accordance with the techniques herein and that generally comprises one or more headers 310 and a payload 320. Illustratively, header 310 may comprise a source address 312, a destination address 314 (and/or various labels, encapsulation headers, etc.). In addition, as described below, the headers may also optionally carry a type field 315, and an explicit packet identifier (ID) field 316. According to the techniques herein, a distinguisher value 318, such as a field within a header 310 or else a new IPv6 extension header, is defined that carries a counter value ("k" herein). Such a counter is used to distinguish copies/versions of duplicated packets 300, e.g., representing a duplicate number where, e.g., k=1 means that the packet is the first copy, k=2 means that the packet is a second copy of the data packet, and so on. (The values 1, 2, etc., are merely examples, and any values may be used.)

As described below, the originating node transmits a first packet along a first (e.g., preferred) path, and optionally after expiration of a timer T1, transmits a second copy of the packet along a different path. Nodes receiving a copy of the data packet 300 cache/store the first received instance of the packet itself or a unique ID of the packet (e.g., a hash). FIG. 4 illustrates a simplified table/cache 400 that may be used to store the packet information used in the illustrative technique described below. In particular, entries may be populated with a field 410 for storing the packet itself, a packet ID, or a hash of the packet, generally referred to as a "packet ID" as described herein. Along with that packet ID 410, the receiving node also stores the corresponding distinguisher value 420 that is associated with the stored/cached packet, i.e., was indicated in the packet when it was received, accordingly.

Note that previously received packets may be discarded from storage upon expiration of a length of time since the particular previously received packet was stored, e.g., a timer T2. Note also that values for T1 and T2 may affect how diverse a set of paths are, such that, in the worst case, packet copies may follow a not fully diverse path, which may be acceptable in certain configurations, or else at the other end of the spectrum, packets may be buffered for longer than necessary. Adjustment to the values of T1/T2 may be made locally by the nodes, or else centrally, e.g., by a network management service (NMS) device or root device, etc. For example, adjustments may be made based on a path diversity success rate, a length of time packets are buffered, etc., and may be equal for all nodes in the network or may be dynamically adjusted according to various factors, such as the node's position within the network, e.g., hop-distance to the root node or else in real-time relation to the source and/or destination of the packet.

An example of the technique according to one or more illustrative embodiments herein is now described within reference generally to FIGS. 5A-5E below. In particular, after transmitting a first copy of a packet (e.g., "k=1") from an originating device (e.g., node 51) to a preferred next-hop device (e.g., node 41), and optionally after waiting a length of time (expiration of the timer T1) after transmitting the first version of the packet, the counter k is incremented, an alternate next-hop is selected from the routing protocol (e.g., in a FIB/RIB, such as a backup parent in the case of RPL), and the new/second copy of the data packet (e.g., "k=2") is sent to that alternate next-hop (e.g., node 42). Specifically, this second transmitted version of the packet has the same packet ID as the first packet, and has a second distinguisher value that is different from the first distinguisher value.

Note that the counter k (distinguisher 318) is used to determine whether a received packet corresponds to a retransmitted packet or a new copy of a packet. That is, the same packet may be received twice if first copy of the packet or the acknowledgment (ACK) for the first packet is lost. Said differently, upon determining that a particular version of the packet did not reach a given destination, the originating node (or any other intermediate node along the path) may retransmit the particular lost version of the packet to the respective next-hop node (original receiver of the particular version) with the same packet ID and the previously used distinguisher value. Note further that after so many "lost packets," the originator (or any other intermediate node along the path) may determine that the corresponding path is broken, and may chose a new path (a new next-hop) to receive the packet, accordingly.

Upon receiving such diversely routed packets, receiving nodes (or "forwarders") inspect whether the same packet has been received for that value of k. That is, upon receiving a packet 300 having a packet ID 316 (or else a particular computed hash or the packet itself) and a distinguisher value 318, the receiving node may determine whether any previously received packet at the node had a same packet ID (e.g., a same hash) and a different distinguisher value, e.g., based on a lookup operation into stored values (IDs, hashes, etc.) of the table/cache 400 described above.

If no similar packet has been received, that is, no previously received packet has the same packet ID (or same data packet content), then the packet is processed by the receiving node (e.g., a stored/cached) and forwarded along the preferred path to its destination via an associated selected next-hop node with the same distinguisher value 318. In addition, if a similar packet has been previously received, though with the same distinguisher value as noted above, then the packet may be forwarded to the same previously selected next-hop node as a retransmission, accordingly.

If, however, a similar packet (packet ID) has been received (e.g., prior to the expiration of timer T2) with a different distinguisher value (value of k), then the receiving node sends a signal 540 back to the sender to indicate that an alternate path should be used. Such a "negative" signal could be sent using a negative ACK (NACK) at the Link layer (if supported by the link layer in use), or an ICMP packet with a newly defined code, or other types of explicit messages. Note that in many suitable routing protocols, such as RPL or RIP, etc., those skilled in the art will appreciate the notion of a preferred next-hop and backup or alternate next-hops, and thus alternate/backup next-hops may be selected should the preferred next-hop be determined as attempting to "merge" diverse paths.

Figure 5A:
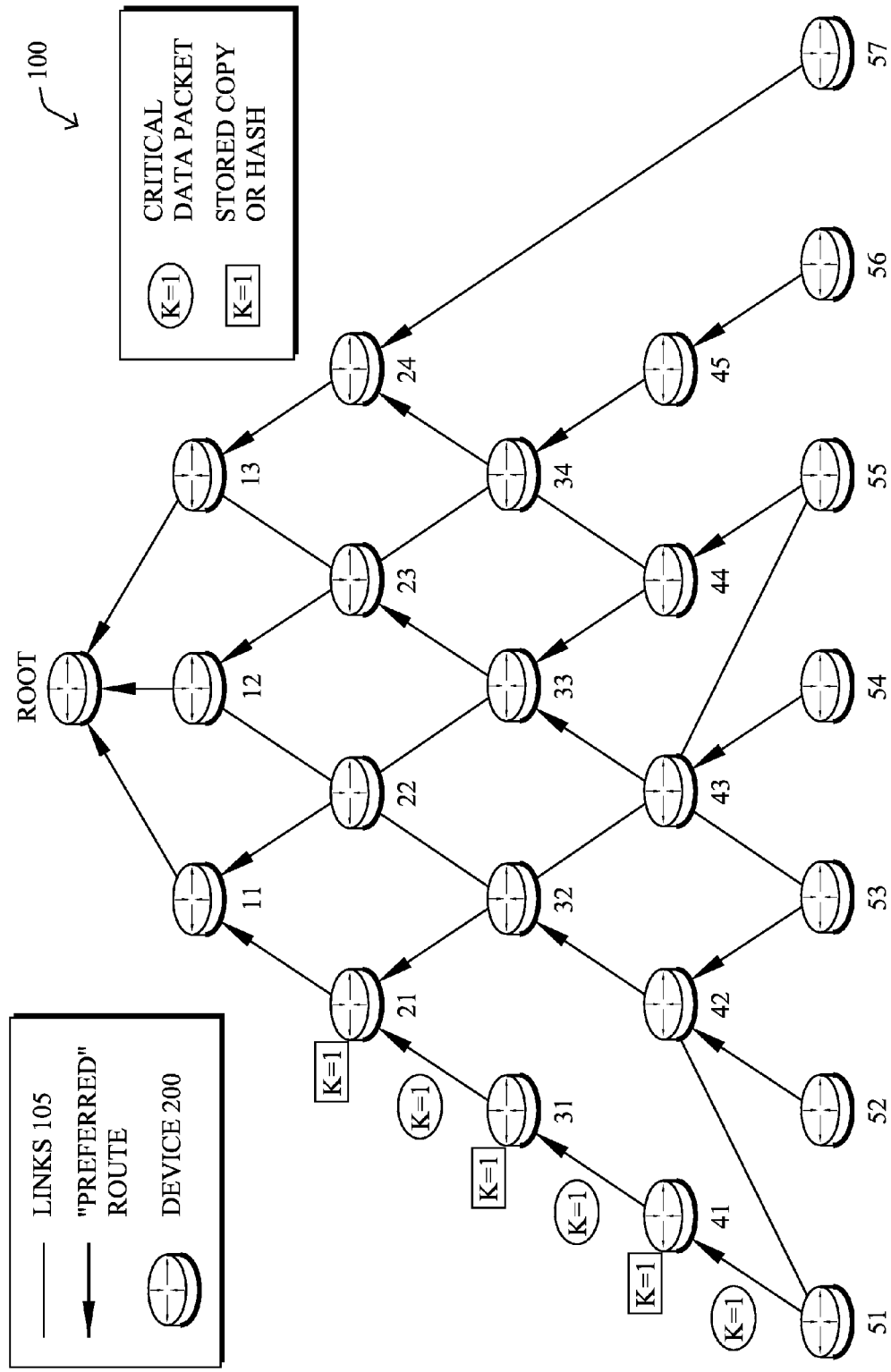
FIGS. 5A-5E illustrate an example of diverse path forwarding using trial and error.
Figure 5B:
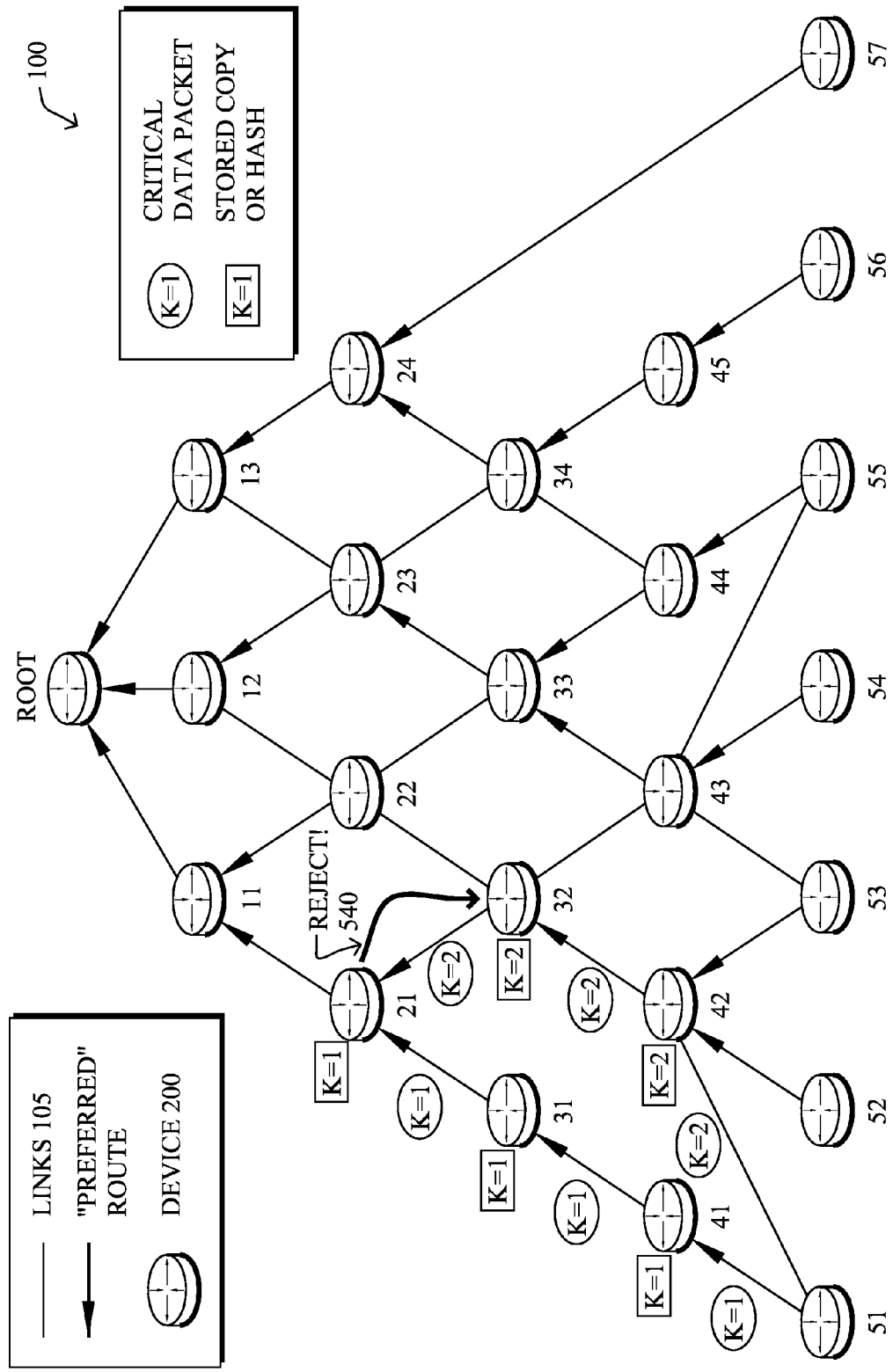
Figure 5C:
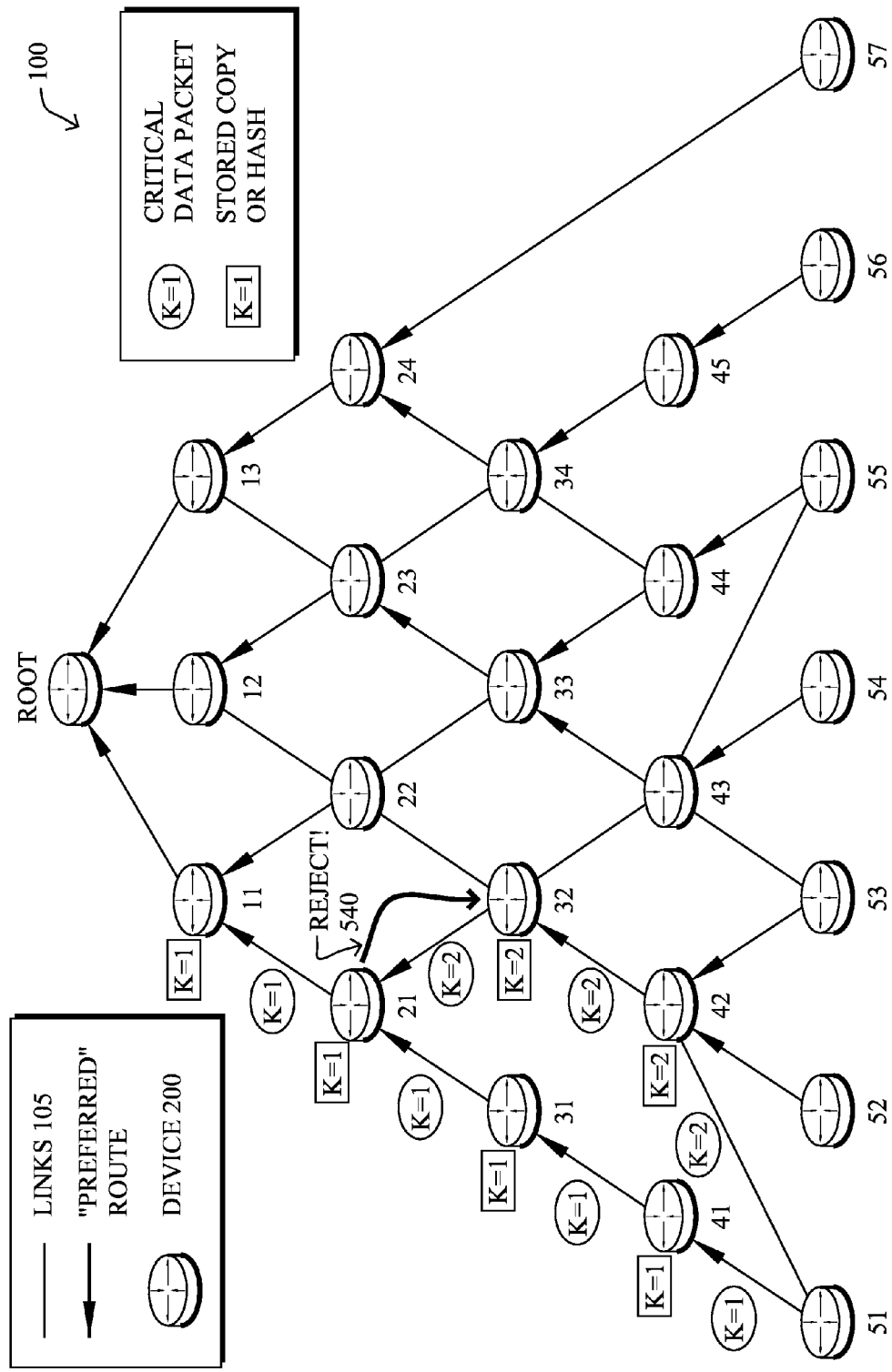
Figure 5D:
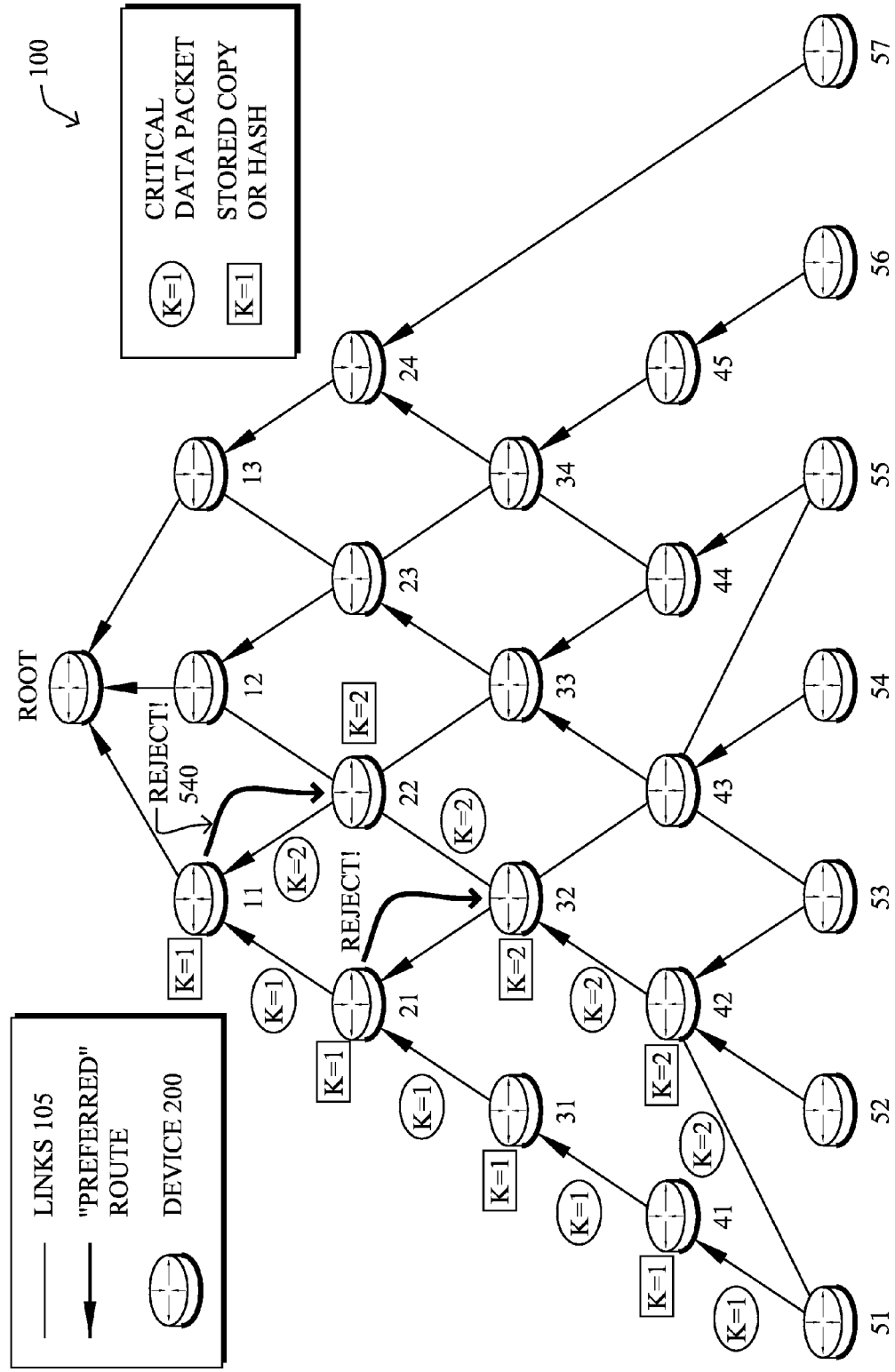
Figure 5E:
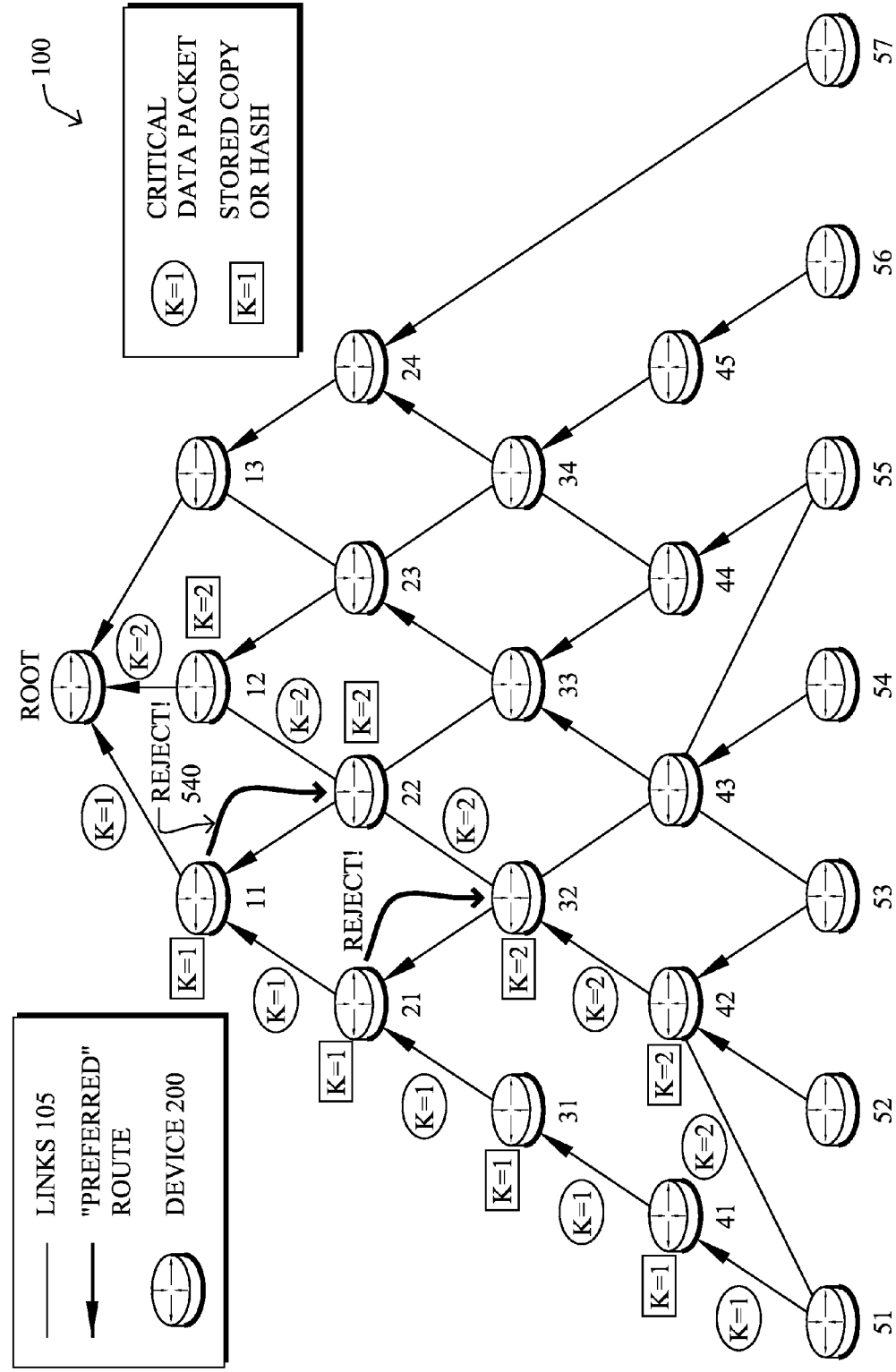

As shown in the example, assume that node 21 in FIG. 5A has received the first packet "k=1." Once node 32 attempts to forward its "k=2" packet to node 21 as in FIG. 5B, node 21 determines that is has already seen this particular packet, and since the distinguisher values 318 are different, that this second packet from node 32 is erroneous (i.e., attempts to merge diverse paths). In response to receiving the error signal ("reject") 540 from the selected next-hop node 21 (i.e., a signal that the forwarded packet has the same packet ID and different distinguisher value of another packet previously received by the selected next-hop node), the sender node 32 may attempt to forward the packet to a different next-hop node, e.g., node 22. Similarly, assuming node 11 has received the "k=1" packet as in FIG. 5C, if node 22 again attempts to merge the diverse paths as shown in FIG. 5D, node 22 is directed to use an alternate path. Accordingly, as shown in FIG. 5E, eventually, through trial and error, diverse paths may reach the destination (e.g., root node). Once at the destination, packets with different distinguishers (different value of k) may be discarded, e.g., in some cases waiting until receiving all copies, (e.g., for application layer acknowledgment) before choosing one copy to process.

In this manner, generally, the first packet may follow the shortest/preferred path (e.g., along a DAG for example), and the second packet may generally avoid resources used for the first path. Notably, in one embodiment, certain devices may be configured to recall the rejections 540 and alternate next-hop selections, such that if future packets are received from a same source 312 and to a same destination 314 (e.g., a packet flow, or simply an occasional packet, such as data readings), the same diverse paths may be used without the need for the "trial" transmissions in the first place (though due to changes in time, diverse-path-merging "errors" may still be encountered in the future).

In the best case, depending on the routing topology, the diverse path will not overlap with the preferred path, though if it does, packets may visit some of the nodes that were traversed by the first packet. In particular, as an alternative (or extension) to one or more embodiments described above, in response to determining that a particular previously received packet has the same packet ID and different distinguisher value, i.e., that another copy of the packet has already been received from a different path, a receiving node can forward the packet to a different next-hop node than a next-hop node to which the particular previously received packet was forwarded.

Figure 6:
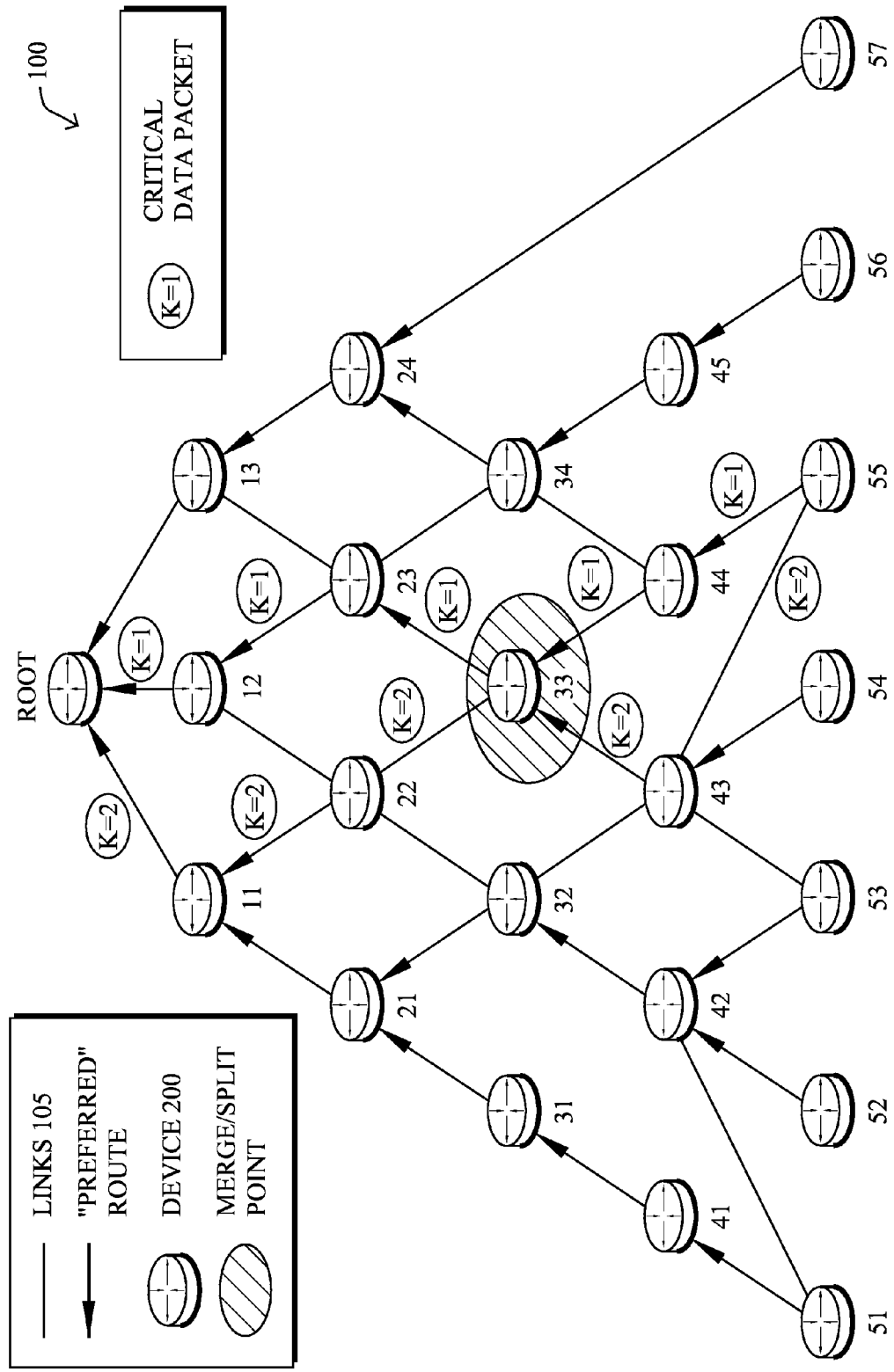
FIG. 6 illustrates an alternative example of diverse path forwarding using trial and error.

An example of this is shown in FIG. 6, in which node 55 originates a first packet to node 44, and a second packet to node 43. Assuming each of these receiving nodes both forward their respectively received packets to node 33, node 33 may forward the first received packet on its preferred path, e.g., to node 23. However, rather than rejecting the second received packet from node 43 (or in addition to rejecting it), node 33 may decide to forward the second packet on an alternative path, e.g., to node 22, thus attempting to keep the paths at least partially diverse (e.g., overlapping at one or more nodes and/or links). In particular, there may be occasions where a network bottlenecks at one or more network elements (e.g., such as if it is assumed that there are no links between node 43 and 32, nor between node 44 and 34, unlike what is shown in FIG. 6), but then opens up again beyond the bottleneck. According to this technique, therefore, both partially diverse paths may share one or more overlapping segments of the network, such that when able to re-diversify the paths, the network nodes may be able to do so, as shown in FIG. 6, accordingly.

Notably, the techniques herein may first determine whether a packet is a particular type of packet (e.g., critical data), such as based on a type field 315 or other indicators (class, labels, etc.). Specifically, in this manner diverse paths (and the associated techniques) are only used for particular types of packets, accordingly.

Note also that the techniques herein may be used to send an arbitrary number of copies of packets along k paths and is not limited to two diverse paths as described above. For example, the originating node may transmit a third version of the packet having the same packet ID and a third distinguisher value different from the first and second distinguisher values to a third next-hop node different from the first and second next-hop nodes, and a fourth version, etc.

Furthermore, the underlying routing protocol or neighbor discovery protocol (e.g., RPL) may optionally be extended to discover whether a neighbor along the preferred path supports the techniques herein, such that if the preferred next-hop does not support the techniques, this may be used to preferably select another next-hop. In other words, selecting the selected next-hop node described above may be further based on a knowledge that the selected next-hop node is configured to participate in determining whether any previously received packet at the selected next-hop node had a same packet ID and a different distinguisher value than the forwarded packet.

Figure 7:
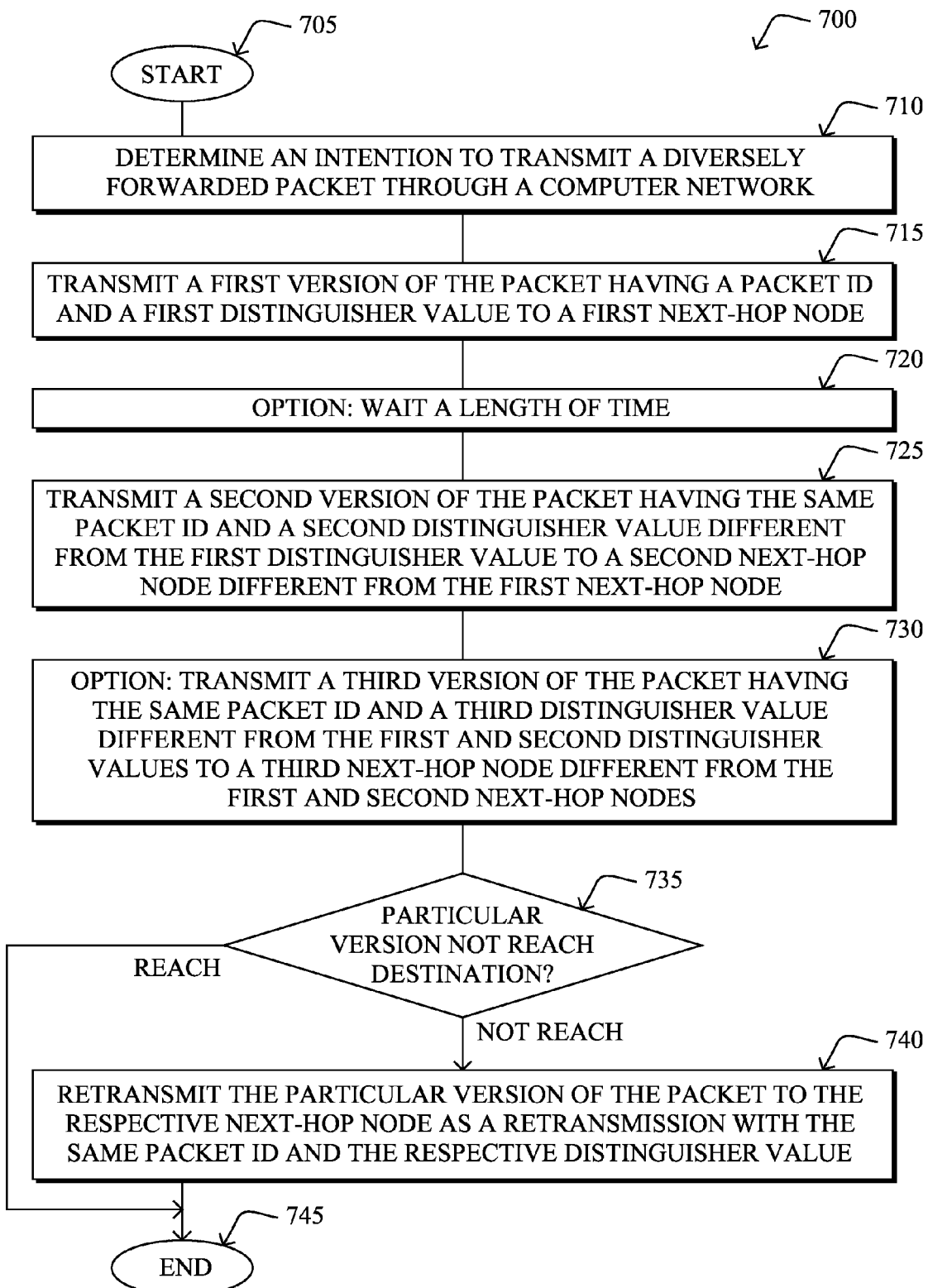
FIG. 7 illustrates an example simplified procedure for diverse path forwarding using trial and error, e.g., from the perspective of the originating node of the packet.

FIG. 7 illustrates an example simplified procedure for diverse path forwarding using trial and error in accordance with one or more embodiments described herein, e.g., from the perspective of the originating node of the packet. The procedure 700 starts at step 705, and continues to step 710, where, as described in greater detail above, a node (e.g., node 51) determines an intention to transmit a diversely forwarded packet 300 through a computer network 100. In response, in step 715 the originating node transmits a first version of the packet having a packet ID 316 (or else the packet may be hashed by receiving nodes) and a first distinguisher value 318 (e.g., "k=1") to a first next-hop node, e.g., preferred node 41. After illustratively waiting a length of time (T1) in step 720, the originating node may then also transmit a second version of the packet having the same packet ID and a second distinguisher value (e.g., "k=2") different from the first distinguisher value to a second next-hop node (e.g., node 42) different from the first next-hop node, i.e., on a diverse path.

Optionally, in step 730, addition (e.g., third) versions of the packet may be transmitted having the same packet ID and a additional distinguisher values different from any other distinguisher values to a additional respective next-hop nodes different from any previous next-hop nodes. Also, if in step 735 the originating node determines that a particular version of the packet did not reach destination, e.g., through link-layer acknowledgments as described above, then in step 740, the originating node may retransmit the particular version of the packet to the respective next-hop node (original to the particular version of the lost packet) as a retransmission with the same packet ID and the respective (original) distinguisher value. The procedure 700 illustratively ends in step 745, e.g., once one or more of the diversely routed packets has successfully reached the intended destination (e.g., the root node).

Figure 8A:
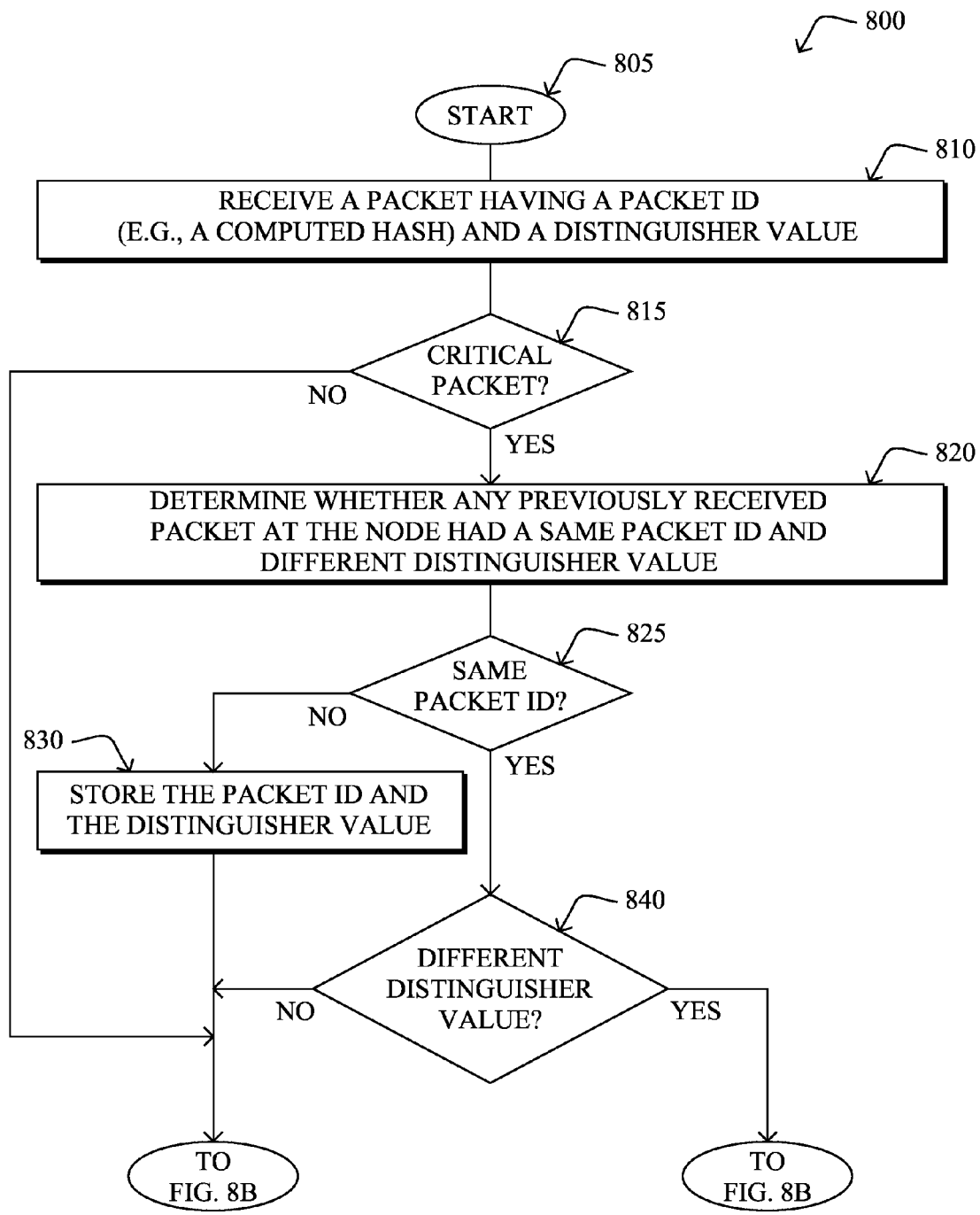
FIGS. 8A-8B illustrate another example simplified procedure for diverse path forwarding using trial and error, e.g., from the perspective of the receiving nodes.
Figure 8B:
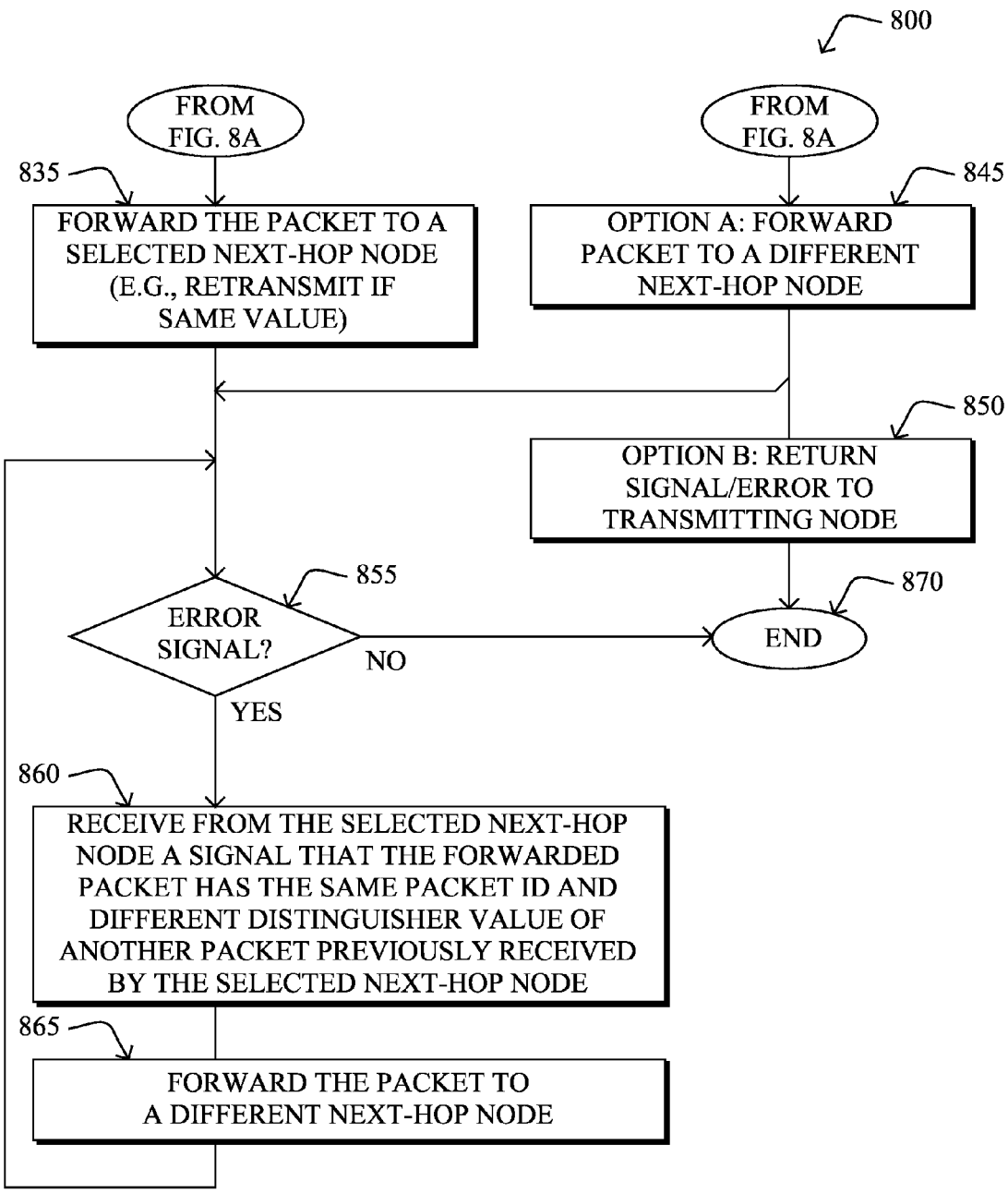

In addition, FIGS. 8A-8B collectively illustrate another example simplified procedure for diverse path forwarding using trial and error in accordance with one or more embodiments described herein, e.g., from the perspective of the receiving nodes. The procedure 800 starts at step 805, and continues to step 810, where, as described in greater detail above, a receiving node (e.g., node 21) receives a packet 300 having a packet ID 316 (e.g., or else the receiving node computes a hash for the packet) and a distinguisher value 318. In response, optionally, to the packet being a particular type of protected, e.g., critical, packet in step 815, then in step 820 the receiving node determines whether any previously received packet at the node (in table/cache 400) had a same packet ID and a different distinguisher value. If the packet ID is not the same as any other in step 825, then in step 830 the receiving device stores the packet ID and the corresponding distinguisher value of the packet, and forwards the packet to a selected next-hop node (e.g., node 11) in step 835.

If the packet ID is the same as another ID in step 825, then in step 840 the receiving device may also determine whether the packet has a different distinguisher value. If not (i.e., same ID, same distinguisher value), then the packet is a retransmission, and the receiver may retransmit the packet in step 835 to the original selected next-hop node. If, on the other hand, in step 840 the distinguisher value is not the same, then optionally, as described above, the receiving node may forward the packet to a different next-hop node in step 845, and/or may return a signal/error 540 to the transmitting node (e.g., node 32) in step 850.

Note that if there is an error signal in step 855, meaning in step 860 that the receiving node (e.g., node 21) itself receives an error signal from the selected next-hop node that the forwarded packet has the same packet ID and different distinguisher value of another packet previously received by the selected next-hop node, then in step 865 the receiving node forwards the packet to a different next-hop node, i.e., on a (hopefully) diverse path. The procedure 800 ends in step 870, in response to no errors in step 855, or in response to returning an error signal in step 850. Note that as described above, the decisions made during procedure 800 may be maintained for future packet transmissions, e.g., sending all diversely routed packets for a particular source/destination pair along the same diverse (alternate) next-hop path.

It should be noted that while certain steps within procedures 700-800 may be optional as described above, the steps shown in FIGS. 7-8B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The novel techniques described herein, therefore, provide for diverse path forwarding using trial and error in a computer network. In particular, the trial and error techniques herein are well-suited for constrained networks, such as LLNs. By relying on the use of a data-driven trial and error technique, the embodiment described herein allow for the sending of duplicate (e.g., critical) packets in an LLN along diverse paths (a critical and challenging issue), regardless of the routing protocol in use, thus allowing diverse paths even in networks using distance vector protocols (e.g., RPL), without involving complex calculation and signaling. The techniques herein also do not require any "brute force" broadcasting to deliver a packet, i.e., the packets are unicast and follow the computed (e.g., shortest/best) path for a first packet, while a second copy of the packet follows a diverse path dynamically computed thanks to dataplane "trial and error" feed-back.

While there have been shown and described illustrative embodiments that provide for diverse path forwarding using trial and error in a computer network, it is to be understood that various other adaptations and modifications may be made within the spirit and scope of the embodiments herein. For example, the embodiments have been shown and described herein with relation to LLNs. However, though particularly well-suited for LLNs and constrained networks in general, the embodiments in their broader sense are not as limited, and may, in fact, be used with other types of networks. In addition, while certain protocols are shown, such as RPL, other suitable protocols may be used, accordingly. Further, while the techniques generally show data packets receiving diverse path treatment, the embodiment herein are not so limited, and control packets (e.g., critical packets) may also be sent on diverse paths as described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a node, a packet having a packet identifier (ID) and a distinguisher value;
   determining whether any previously received packet at the node had a same packet ID and a different distinguisher value; and
   in response to determining that no previously received packet has the same packet ID and different distinguisher value:
   i) storing the packet ID and the distinguisher value; and
   ii) forwarding the packet to a selected next-hop node.

2. The method as in claim 1, further comprising:
   determining whether the received packet is a particular type of packet; and
   determining whether any previously received packet at the node had the same packet ID and different distinguisher value only in response to the packet being the particular type of packet.

3. The method as in claim 1, wherein determining whether any previously received packet at the node had the same packet ID and different distinguisher value comprises:
   computing a hash of the packet as the packet ID; and
   determining whether a stored hash from any previously received packet at the node is the same as the computed hash of the packet.

4. The method as in claim 1, further comprising:
   discarding a particular previously received packet from storage upon expiration of a length of time since the particular previously received packet was stored.

5. The method as in claim 1, further comprising:
   determining that a particular previously received packet has the same packet ID and a same distinguisher value; and
   in response, forwarding the packet to the selected next-hop node as a retransmission, the selected next-hop node being a same node to which the particular previously received packet was forwarded.

6. The method as in claim 1, further comprising:
   in response to determining that a particular previously received packet has the same packet ID and different distinguisher value, returning a signal to a transmitting node of the packet that the particular previously received packet has the same packet ID and different distinguisher value.

7. The method as in claim 6, wherein the returned signal is selected from a group consisting of: a negative acknowledgment (NACK); and an explicit message.

8. The method as in claim 1, further comprising:
   receiving, from the selected next-hop node, a signal that the forwarded packet has the same packet ID and different distinguisher value of another packet previously received by the selected next-hop node; and
   in response, forwarding the packet to a different next-hop node.

9. The method as in claim 1, further comprising:
   in response to determining that a particular previously received packet has the same packet ID and different distinguisher value, forwarding the packet to a different next-hop node than a next-hop node to which the particular previously received packet was forwarded.

10. The method as in claim 1, further comprising:
    selecting the selected next-hop node based on a knowledge that the selected next-hop node is configured to participate in determining whether any previously received packet at the selected next-hop node had a same packet ID and a different distinguisher value than the forwarded packet.

11. An apparatus, comprising:
one or more network interfaces to communicate in a computer network;
a processor coupled to the network interfaces and adapted to execute one or more processes; and
a memory configured to store a process executable by the processor, the process when executed operable to:
  receive a packet having a packet identifier (ID) and a distinguisher value;
  determine whether any previously received packet at the apparatus had a same packet ID and a different distinguisher value; and
  in response to determining that no previously received packet has the same packet ID and different distinguisher value:
    i) store the packet ID and the distinguisher value; and
    ii) forward the packet to a selected next-hop node.

12. The apparatus as in claim 11, wherein the process when executed to determine whether any previously received packet at the apparatus had the same packet ID and different distinguisher value is further operable to:
compute a hash of the packet as the packet ID; and
determine whether a stored hash from any previously received packet at the apparatus is the same as the computed hash of the packet.

13. The apparatus as in claim 11, wherein the process when executed is further operable to:
determine that a particular previously received packet has the same packet ID and a same distinguisher value; and
in response, forward the packet to the selected next-hop node as a retransmission, the selected next-hop node being a same node to which the particular previously received packet was forwarded.

14. The apparatus as in claim 11, wherein the process when executed is further operable to, in response to determining that a particular previously received packet has the same packet ID and different distinguisher value:
return a signal to a transmitting node of the packet that the particular previously received packet has the same packet ID and different distinguisher value.

15. The apparatus as in claim 11, wherein the process when executed is further operable to:
receive, from the selected next-hop node, a signal that the forwarded packet has the same packet ID and different distinguisher value of another packet previously received by the selected next-hop node; and
in response, forward the packet to a different next-hop node.

16. The apparatus as in claim 11, wherein the process when executed is further operable to, in response to determining that a particular previously received packet has the same packet ID and different distinguisher value:
forward the packet to a different next-hop node than a next-hop node to which the particular previously received packet was forwarded.

* * * * *